(12) United States Patent
Achtermann et al.

(10) Patent No.: US 10,965,684 B2
(45) Date of Patent: *Mar. 30, 2021

(54) LOGICAL ZONES FOR IOT DEVICES

(71) Applicant: International Business Machines Corporation, Armonk, NY (US)

(72) Inventors: Jeffrey M. Achtermann, Austin, TX (US); Harrison Kurtz, Austin, TX (US); Maharaj Mukherjee, Poughkeepsie, NY (US); Joanna W. Ng, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,068

(22) Filed: Nov. 16, 2018

(65) Prior Publication Data

US 2019/0109856 A1 Apr. 11, 2019

Related U.S. Application Data

(63) Continuation of application No. 15/490,170, filed on Apr. 18, 2017.

(51) Int. Cl.
*G06F 7/04* (2006.01)
*G06F 15/16* (2006.01)
(Continued)

(52) U.S. Cl.
CPC ........ *H04L 63/104* (2013.01); *H04L 41/0893* (2013.01); *H04L 63/102* (2013.01);
(Continued)

(58) Field of Classification Search
CPC ... H04L 63/105; H04L 63/107; H04L 63/104; H04L 63/10; H04L 63/102; H04L 67/10;
(Continued)

(56) References Cited

U.S. PATENT DOCUMENTS 9,419,941 B2    8/2016   Sun et al.
2011/0250901 A1*   10/2011   Grainger ............... H04W 4/021
                                                                                                       455/456.1
(Continued)

FOREIGN PATENT DOCUMENTS

CN      102036231 B    5/2013
DE      4339460 C1     4/1995
EP       1689206 A1     8/2006

OTHER PUBLICATIONS

Zhexuan Song, Alvaro A. Cardenas, Ryusuke Masuoka, Semantic Middleware for the Internet of Things, 2010 IEEE (Year: 2010).*
(Continued)

*Primary Examiner* — Amie C. Lin
(74) *Attorney, Agent, or Firm* — Mollborn Patents, Inc.; Fredrik Mollborn

(57) ABSTRACT

Methods for logically grouping Internet of Things (IoT) devices are described. One or more logical zones are defined. Each logical zone includes one or more physical zones, one or more virtual zones, or a combination of physical and virtual zones. Each IoT device is associated with at least one logical zone. Communication between the IoT devices is restricted based on the zones with which the IoT devices are associated.

8 Claims, 3 Drawing Sheets

(51) Int. Cl.
*G06F 17/30* (2006.01)
*H04L 29/06* (2006.01)
*H04L 12/24* (2006.01)
*H04W 4/021* (2018.01)
*H04L 29/08* (2006.01)

(52) U.S. Cl.
CPC .......... *H04L 63/107* (2013.01); *H04L 67/125* (2013.01); *H04W 4/021* (2013.01); *H04L 67/10* (2013.01)

(58) Field of Classification Search
CPC .... H04L 67/125; H04L 41/0893; H04W 4/02; H04W 4/021; G16Y 30/10; G16Y 40/35; G16Y 40/50
See application file for complete search history.

(56) References Cited

U.S. PATENT DOCUMENTS

| | | | |
|---|---|---|---|
| 2015/0121470 A1* | 4/2015 | Rongo | H04W 4/70 726/4 |
| 2015/0128207 A1* | 5/2015 | Cabrera | H04L 63/20 726/1 |
| 2016/0202692 A1 | 7/2016 | Patel et al. | |
| 2016/0212099 A1 | 7/2016 | Zou et al. | |
| 2016/0234689 A1 | 8/2016 | Stan et al. | |
| 2016/0241439 A1* | 8/2016 | Idnani | H04L 41/0816 |
| 2016/0308875 A1 | 10/2016 | Judge et al. | |
| 2016/0381030 A1* | 12/2016 | Chillappa | H04L 63/102 726/11 |
| 2017/0048666 A1* | 2/2017 | Choi | H04W 4/021 |
| 2017/0149775 A1* | 5/2017 | Bachar | H04L 67/303 |
| 2018/0234294 A1* | 8/2018 | Wadekar | H04L 41/0806 |

OTHER PUBLICATIONS

Authentication in the Internet of Things—Infineon Technologies. Downloaded Feb. 3, 2017. pp. 1-10.
"Securing the Internet of Things: A Proposed Framework"; Cisco; Downloaded Dec. 21, 2016. pp. 1-9.
Mordeno et al. "Identity and Access Management for the Internet of Things—Summary Guidance". Downloaded Dec. 21, 2016; 2016 Cloud Security Alliance; pp. 1-15.
Myrick, Andrew. Google aims to get rid of passwords to replace them with 'trust scores'; Downloaded Feb. 8, 2017. © Phandroid. com, 2007-2017. pp. 1-4.
Roman et al., "On the features and challenges of security and privacy in distributed internet of things", Elsevier, 2013. pp. 1-14.
"Using Security Zones to Protect Your Network Against IoT Security Risks"; Vircom; Downloaded Apr. 18, 2017. pp. 1-3.
"Internet of Things security architecture"; Microsoft; Downloaded Apr. 18, 2017. pp. 1-16.
List of IBM Patents or Patent Applications Treated as Related.

* cited by examiner

LOGICAL ZONES FOR IOT DEVICES

BACKGROUND

The present invention relates to Internet security, and more specifically, to functional grouping and security for Internet of Things devices.

The Internet of Things (IoT) is the internet working of physical devices, vehicles, buildings, and other items embedded with electronics, software, sensors, actuators, and network connectivity that enable these s to collect and exchange data. The IoT allows objects to be sensed and/or controlled remotely across existing network infrastructure, creating opportunities for more direct integration of the physical world into computer-based systems, and resulting in improved efficiency, accuracy and economic benefit in addition to reduced human intervention.

"Things," in the IoT sense, can refer to a wide variety of s such as heart monitoring implants, biochip transponders on farm animals, electric clams in coastal waters, automobiles with built-in sensors, DNA analysis devices for environmental/food/pathogen monitoring or field operation devices that assist firefighters in search and rescue operations. These devices collect useful data with the help of various existing technologies and then autonomously flow the data between other devices. As the IoT expands, the need to be able to group "things" by functional semantics and the need to enhance the security for IoT devices also increases, such that the IoT devices cannot be hacked into and be remotely controlled by people with malicious intent.

SUMMARY

According to one embodiment of the present invention, methods are provided for logically grouping Internet of Things (IoT) devices. One or more logical zones are defined. Each logical zone includes one or more physical zones, one or more virtual zones, or a combination of physical and virtual zones. Each IoT device is associated with at least one logical zone. Communication between the IoT devices is restricted based on the zones with which the IoT devices are associated The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
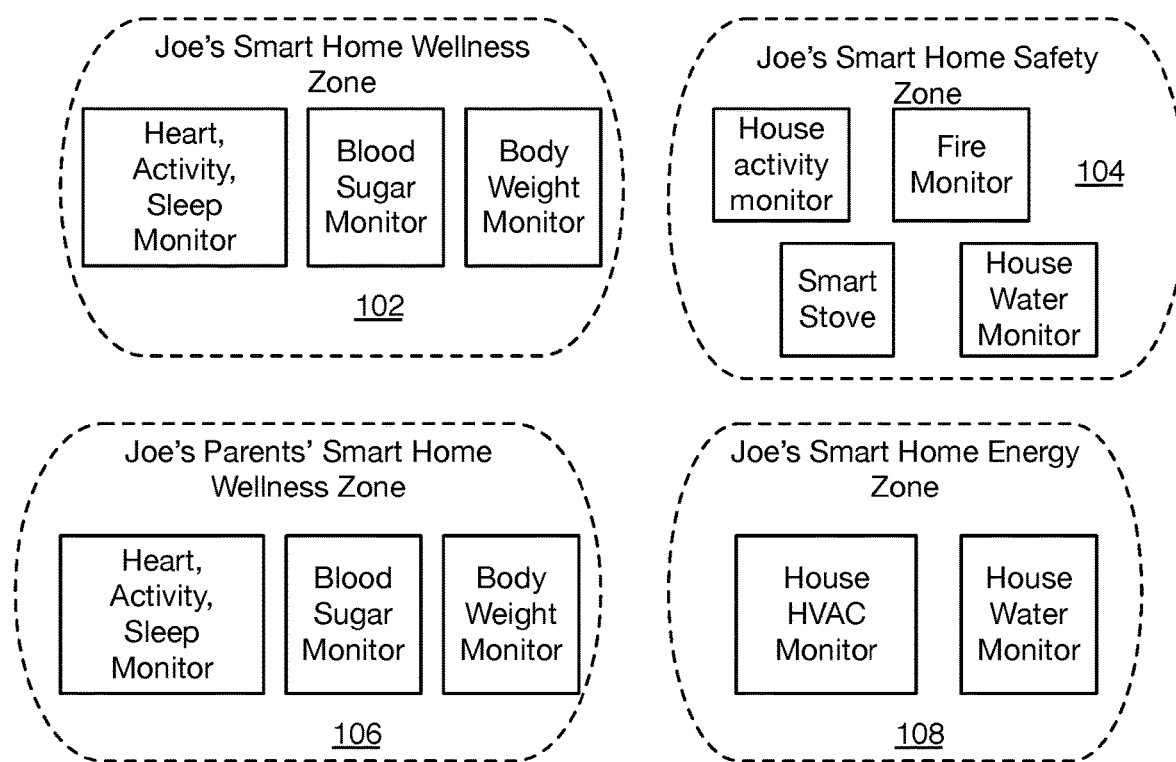
FIG. 1 shows examples of four different logical zones representing groups of IoT devices, in accordance with one embodiment.

In conventional computer networks, the concept of "security zones" and "logical realms" (such as Domain Name Servers (DNS), AppleTalk, Storage Area Networks (SAN) etc.) is well known. Logical zones can be formed for functional reasons, such as grouping of servers dedicated for a purpose. The logical zones are entities to which one or more interfaces are bound. Logical zones provide a means of distinguishing groups of hosts (user systems and other hosts, such as servers) and their resources from one another in order to apply different policies to them. One example of a type of logical zone in a conventional computer network is logical zones for security. These logical zones for security can be described as the "building blocks" for security policies in conventional computer networks. Logical zones for security in a conventional computer network typically have one or more of the following properties:

Policies—Active security policies that enforce rules for the transit traffic, in terms of what traffic can pass through the firewall, and the actions that need to take place on the traffic as it passes through the firewall.

Screens—A firewall typically secures a network by inspecting, and then allowing or denying, all connection attempts that require passage from one security zone to another. Generally, for every security zone, it is possible to set screen options that detect and block various kinds of traffic that the device determines as potentially harmful.

Address books—IP addresses and address sets that make up an address book to identify its members so policies can be applied to them.

Security zones are also applied within the context of IoT. There are two main categories of work regarding Security Zone applied in IoT. The first category pertains to network defense. The main problem statement that this category of work is trying to solve is: "How can security zones be used to protect a network against IoT vulnerabilities?" One solution to this problem is to use several security zones having different levels of security, for example, as follows:

Green Zone: These are mission-critical servers and workstations that see those servers, file shares, etc.

Blue Zone: Line employee workstations, they have limited access to network resources but don't necessarily see mission critical systems.

Orange Zone: Wi-Fi routers for visitors, contractors and other people go here. Have very restricted view to internal systems (if any).

Red Zone: Internet facing systems/DMZ.

Typically, it would be appropriate to put IoT devices in the "orange zone," where they are protected from Internet facing systems, while at the same time having no access to internal systems. That way, if an IoT device gets compromised, the people hacking the IoT device cannot enter the blue or green zones, where sensitive data is kept.

The second category pertains to trust boundaries. This category is used by products, such as Microsoft Azure IoT security architecture, to segment (or to group) a solution based on shared security requirements. The main problem statement that this category of work is trying to solve is: "How can a solution architecture be divided so that s, gateways, cloud services etc. that share the same threat model be put together within the same trust boundary?" One solution to this problem is to use several security zones based on a "threat level," for example, as follows:

Device,

Field Gateway,

Cloud gateways, and

Services.

The security zones are broad way to segment a solution. Each zone often has its own data and authentication and authorization requirements. The security zones can also be used to isolate damage and restrict the impact of low trust zones on higher trust zones.

A problem with these two approaches, however, is that the security zones are defined based on a physical division of hardware and connected devices. However, the connected IoT devices often span across thousands of miles of geography, and putting physical boundaries across several IoT devices may be physically impossible. Thus, there is a need for improved techniques for grouping IoT devices in a way that is not constrained by physical factors, while at the same time not compromising the security of the IoT devices.

The various embodiments of the invention pertain to techniques for creating new categories of security zones for IoT devices. In particular, one of the problem statements that the various embodiments of this invention solve is: "How can logical security zones be created for devices, based on usage of the devices across multiple networks and solution architectures, as well as across several physical division such as geography?" In some embodiments, this can be achieved by creating a new category of "logical zone" for IoT devices.

A logical zone, as used herein, can either be a physical zone or a virtual zone, or a combination thereof. For example, one can create a logical zone for all IoT devices related to "wellness," which is distinctively different from logical zone for IoT devices dedicated for "home management."

A physical zone may be either two-dimensional or three-dimensional. In some embodiments, a two-dimensional physical zone can be defined, for example, using a geo-locational boundary, or by geo-fencing using a Global Positioning System (GPS). In other embodiments a two-dimensional physical zone can be defined, for example, using near field networks such as Bluetooth or Wifi, or by visual means, such as a camera. For example, a two-dimensional physical zone can be a floor of a building or parts thereof. A three-dimensional zone can be defined by stacking several two-dimensional zones together, or by other means such as voxel or solid modeling. For example, a three-dimensional physical zone can be a building or similar structure, which includes multiple two-dimensional zones. Joe's Smart Home can be a logical zone in itself.

A virtual zone is a zone that is not tied to a physical location, but rather represents the position of a IoT device or a group of IoT devices with respect to a defined hierarchy or a group or a network. For example, items that are located within a physical zone, such as a particular floor or part of the floor of a building, may have a different access levels compared to items located in other parts of the floor. Similarly, parts of a building may be configured in different ways than other parts of the building, from a security perspective. In such situations, virtual zones can be created within the physical zones for these particular IoT devices that require different policies from the remaining IoT devices within the physical zones.

As was mentioned above, a logical zone can be defined by either exclusively as one or more physical zones, one or more virtual zones, or a combination thereof. For example, two or more mutually exclusive physical zones can be defined as a logical zone by connecting them virtually. Similarly, items that are located within the same physical zone can reside in several different virtual zones. As a result of using these logical zones, there are no longer any physical constraints as to where the IoT devices are located, and IoT devices can be logically grouped, for example, for security purposes even if they are physically located thousands of miles away from each other.

FIG. 1 shows a few examples of logical zones. The first logical zone, Joe's Smart Home Wellness Zone, 102, contains IoT devices relating to health, such as a heart, sleep and activity monitor, a blood glucose monitor, and a body weight monitor. The second logical zone, Joe's Smart Home Safety Zone, 104, contains IoT devices relating to home safety, such as a house activity monitor, a fire monitor, a smart stove and a theft prevention IoT device. The third logical zone, Joe's Parents' Smart Home Wellness Zone, 106, is similar to Joe's Smart Home Wellness Zone 102, but contains IoT devices related to Joe's parents. Lastly, the fourth logical zone, Joe's Smart Home Energy Zone, 108, contains IoT devices relating to energy items, such as a house water monitor and a house HVAC monitor. As the reader realizes, these are merely some examples of logical zones and essentially any number and types of IoT devices can be grouped into logical zones.

Figure 2:
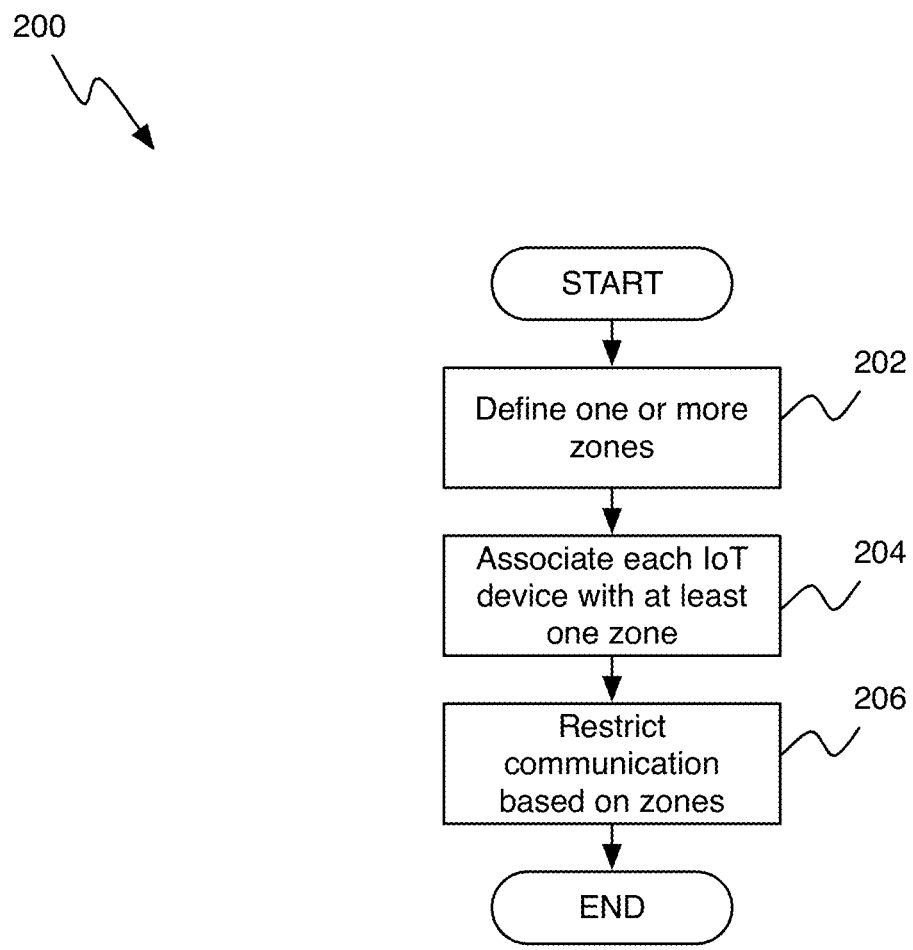
FIG. 2 shows a process 200 for creating logical zones for a group of IoT devices in accordance with one embodiment.

With reference now to FIG. 2, a process 200 will now be described for creating logical zones for a group of IoT devices. As can be seen in step 202, the process starts by defining one or more logical zones. As was mentioned above, these logical zones can be physical, virtual, or various combinations thereof.

Next, each IoT device is associated with at least one logical zone in step 204. In one embodiment, this association can be made by a user assigning the IoT devices to logical zones. When assigning an IoT device to a logical zone, a URL of the IoT device is included in the logical zone as a container. In another embodiment, the association can be done using a cognitive method, for example, by using metadata associated with IoT devices together with the semantics of the logical zone. For example, Joe's Smart Home Wellness Zone 102 may have identified "wellness" as the semantics of this logical zone. A semantic query of the metadata of all IoT devices from Joe's smart home will result in a list of IoT devices whose semantic relevance is associated with "wellness." Another example of a cognitive method includes connecting previously connected IoT devices or IoT devices sharing certain features based on such knowledge.

Once the IoT devices have been associated with the respective logical zones, they can start communicating with each other based on their logical zone affiliations, step 206. For example, once "Joe's Parents' Home Wellness Logical Zone" 106 is set up, a message blackboard can be set up in a publish-subscribe manner, such that if the activity level is less than 1500 steps a day, the weight loss is more than 5 pounds a week, and the sugar level is below five, the blackboard will send out an urgent alert to Joe, notifying Joe that he should check on his parents urgently. Trusted relationships between IoT devices are described in trusted communication profiles, which are created based on existing knowledge of communication between similar IoT devices, or by using a communication pattern recognition algorithm, based on cognitive learning. If the communications between the IoT devices do not belong to a trusted communication profile, the communication is refused.

The trusted communication profiles can be defined by several methods or combinations thereof. Some examples include:

Create a trusted profile based on one or more zone attributes. Each zone has a certain security attribute based on its functional scope in the IoT realm. If an IoT device does not match the trusted profile, communication is refused. If the IoT device matches the trusted profile, communication is allowed.

Allow communication between IoT devices only when both the IoT devices belong to the same logical zone.

Allow a read/write/view communication from an IoT device at a higher hierarchy zone to an IoT device at a lower hierarchy zone, but not vice versa. The hierarchy can be defined, for example, based on the consequence of security failures. Some part may have isolated or local implications. Some may have wider or more serious implications. For example, a hierarchy of trusted profiles can be set up as follows, using Joe's Smart home in FIG. 1 as an example. Residents of Joe's Smart Home, namely Joe and his wife, have the highest level of trusted profile. They can read/write/view and set up configuration. Close relatives of Joe's Smart Home, namely, Joe's adult children who no longer live there but visit frequently, have the next level of trusted profile, allowing them to view, add their wellness related IoT devices when they visit, but they are not allowed to write or set up any configurations relating to Joe's Smart Home. All other visitors, who have no trusted profiles, cannot take part in any logical zones associated with Joe's Smart Home.

When an IoT device moves from one zone to another, its communication patterns change. Allow any communication stored in a buffer that was done before the IoT device moved to a different logical zone to any other IoT devices in the previous logical zone. After the old buffer is emptied, allow only communications that are allowable within the new profile.

When the ownership of an IoT device changes allow the old communications that are in the buffer before the ownership of the IoT device changed.

It should be noted that these are just a few examples, and that many other variations that fall within the scope of the claims are available to those having ordinary skill in the art.

Figure 3:
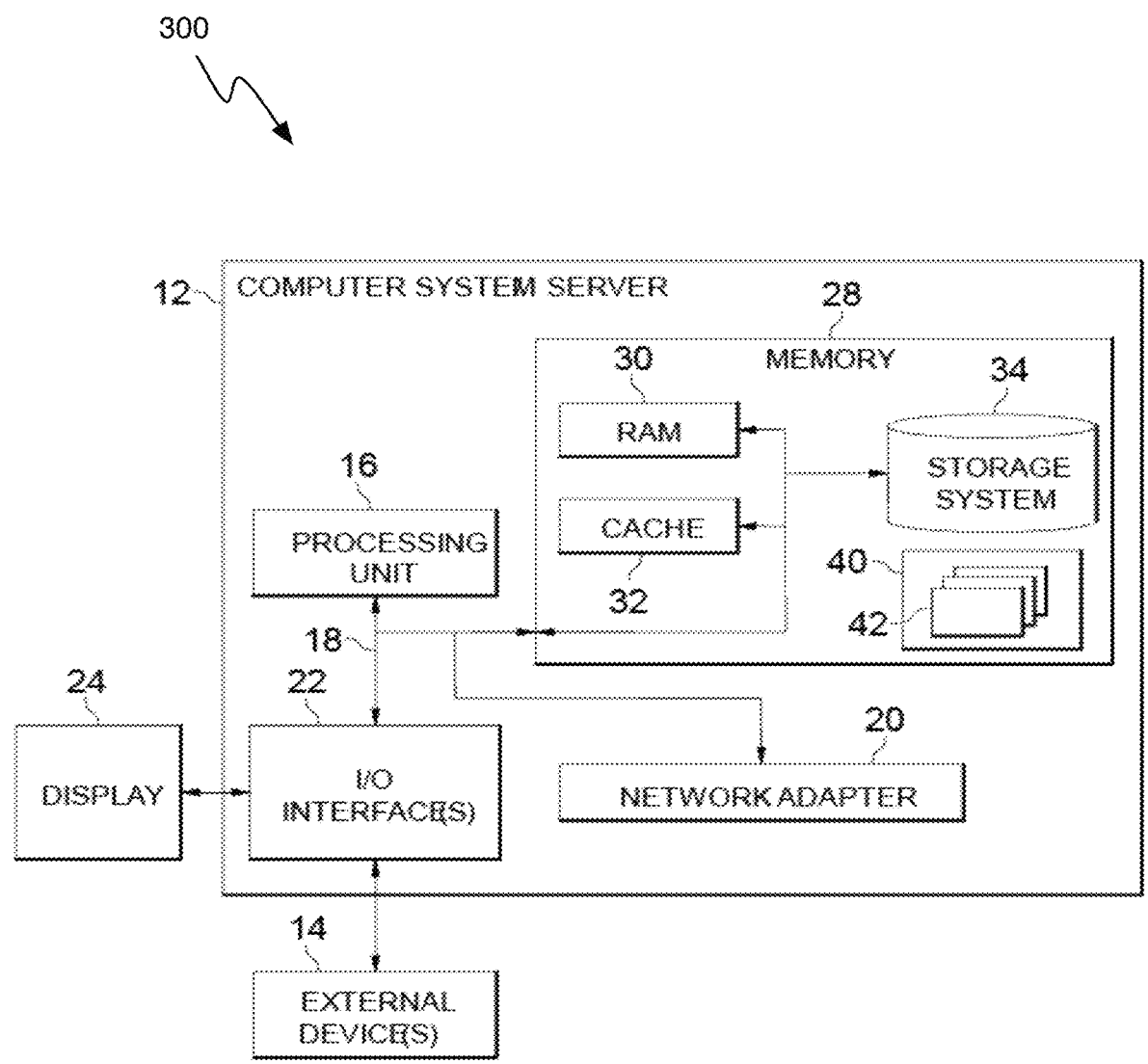
FIG. 3 shows a computer system 300 in which the process 200 can be implemented, in accordance with one embodiment.

FIG. 3 shows a schematic view of a computer system in which various embodiments of the present invention can be implemented. As shown in FIG. 3, the computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system/server 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, and redundant processing units.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for a group of Internet of Things enabled devices, comprising:
   defining one or more logical zones, wherein each logical zone of the one or more logical zones includes one or more physical zones and one or more virtual zones, and wherein the each logical zone of the one or more logical zones has associated semantics;
   in response to the defining the one or more logical zones, associating the group of Internet of Things enabled devices with the one or more logical zones by, for each Internet of Things enabled device in the group of Internet of Things enabled devices:
   determining, through a semantic query, whether metadata associated with the each Internet of Things enabled device in the group of Internet of Things enabled devices is relevant to associated semantics of at least one logical zone of the one or more logical zones; and
   in response to the determining that metadata associated with the each Internet of Things enabled device in the group of Internet of Things enabled devices is relevant to the associated semantics of the at least one logical zone of the one or more logical zones, associating the each Internet of Things enabled device in the group of Internet of Things enabled devices with the at least one logical zone; and in response to the associating the group of Internet of Things enabled devices with the one or more logical zones, restricting communication between Internet of Things enabled devices in the group of Internet of Things enabled devices based on trusted communication profiles, wherein the trusted communication profiles include information about the one or more logical zones with which the Internet of Things enabled devices in the group of Internet of Things enabled devices are associated, and wherein communication is only allowed between the Internet of Things enabled devices in the group of Internet of Things enabled devices that belong to a same logical zone of the one or more logical zones.

2. The method of claim 1, wherein a physical zone is a two-dimensional zone that is defined using one or more of: a geo-location boundary, geo-fencing using a global positioning system, a near-field wireless network, and a camera.

3. The method of claim 2, wherein a physical zone is a three-dimensional zone that includes two or more two-dimensional zones.

4. The method of claim 2, wherein a virtual zone includes one or more subsets of one or more physical zones.

5. The method of claim 1, wherein the restricting of the communication between the Internet of Things enabled devices in the group of Internet of Things enabled devices includes:

defining a particular trusted communication profile between the Internet of Things enabled devices in the group of Internet of Things enabled devices for which communication is allowed; and in response to determining that a particular Internet of Things enabled device does not match the particular trusted communication profile, refusing communication between the particular Internet of Things enabled device and other Internet of Things enabled devices.

6. The method of claim 1, wherein the restricting of the communication between the Internet of Things enabled devices in the group of Internet of Things enabled devices includes:

allowing communications from an Internet of Things enabled device at a higher hierarchy logical zone to an Internet of Things enabled device at a lower hierarchy logical zone.

7. The method of claim 1, wherein the restricting of the communication between the Internet of Things enabled devices in the group of Internet of Things enabled devices includes:

in response to an Internet of Things enabled device moving from one logical zone to a new logical zone, allowing communications that were pending prior to the move to the new logical zone.

8. The method of claim 1, wherein the restricting of the communication between the Internet of Things enabled devices in the group of Internet of Things enabled devices includes:

in response to an Internet of Things enabled device changing ownership, allowing communications that were pending prior to the change of ownership.

* * * * *